United States Patent
Rodriguez et al.

(10) Patent No.: US 11,986,992 B2
(45) Date of Patent: May 21, 2024

(54) METHODS FOR FORMING FILMS AND THEIR RELATED COMPUTING DEVICES

(71) Applicant: ExxonMobil Chemical Patents Inc., Baytown, TX (US)

(72) Inventors: George Rodriguez, Houston, TX (US); Donald A. Winesett, Houston, TX (US); Liezhong Gong, Basking Ridge, NJ (US); Thomas T. Sun, Clinton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 749 days.

(21) Appl. No.: 17/048,026

(22) PCT Filed: May 22, 2019

(86) PCT No.: PCT/US2019/033512
§ 371 (c)(1),
(2) Date: Oct. 15, 2020

(87) PCT Pub. No.: WO2019/226766
PCT Pub. Date: Nov. 28, 2019

(65) Prior Publication Data
US 2021/0107202 A1    Apr. 15, 2021

Related U.S. Application Data

(60) Provisional application No. 62/674,877, filed on May 22, 2018.

(30) Foreign Application Priority Data

Jun. 14, 2018 (EP) ...................... 18177657

(51) Int. Cl.
| | | |
|---|---|---|
| *B29C 48/92* | (2019.01) | |
| *B29C 48/00* | (2019.01) | |
| *B29C 48/10* | (2019.01) | |
| *C08F 10/02* | (2006.01) | |
| *C08J 5/18* | (2006.01) | |
| *B29L 23/00* | (2006.01) | |

(52) U.S. Cl.
CPC .......... *B29C 48/92* (2019.02); *B29C 48/0018* (2019.02); *B29C 48/10* (2019.02); *C08F 10/02* (2013.01); *C08J 5/18* (2013.01); *B29K 2023/06* (2013.01); *B29L 2023/001* (2013.01); *C08J 2323/06* (2013.01)

(58) Field of Classification Search
CPC ...... B29C 48/0018; B29C 48/92; B29C 48/10
See application file for complete search history.

(56) References Cited

U.S. PATENT DOCUMENTS

| 7,116,414 B2 | 10/2006 | Long et al. |
| 9,695,290 B2 | 7/2017 | Malakoff |
| 2003/0096128 A1 | 5/2003 | Farley et al. |
| | (Continued) | |

FOREIGN PATENT DOCUMENTS

WO    WO2005/049663    *    6/2005

*Primary Examiner* — Joseph A Miller, Jr.
(74) *Attorney, Agent, or Firm* — ExxonMobil Technology and Engineering Company-Chem (57) ABSTRACT

Methods for forming polyolefin films using a model including a multivariate adaptive regression splines (MARS)-derived algorithm are provided. Related computing devices are also provided.

6 Claims, 4 Drawing Sheets

(56) References Cited

U.S. PATENT DOCUMENTS

2009/0297810 A1 12/2009 Fiscus et al.
2013/0319131 A1 12/2013 Inn et al.
2015/0293005 A1 10/2015 Reimers

* cited by examiner

METHODS FOR FORMING FILMS AND THEIR RELATED COMPUTING DEVICES

CROSS-REFERENCE OF RELATED APPLICATIONS

This application is a National Stage under 35 U.S.C. § 371 of PCT Application Serial No. PCT/US2019/033512, filed May 22, 2019, which claims priority to U.S. Provisional Application Ser. No. 62/674,877, filed May 22, 2018, and to EP 18177657.6, filed Jun. 14, 2018, the disclosures of which are hereby incorporated by reference in their entireties.

FIELD OF THE INVENTION

The disclosure relates methods for forming films, primarily, films made from polyolefin polymer, using a model that estimates (A) the machine direction tear of a polymer film based on the physical properties of the polymer and the blown film extrusion conditions or (B) the necessary physical properties of the polymer and the necessary blown film extrusion conditions to achieve a polymer film with a desired machine direction tear. The disclosure also relates to computing devices employing such methods.

BACKGROUND OF THE INVENTION

Blown film techniques are common ways polyethylene films are manufactured. Such films can be used to make bags, plastic wrap, agricultural film, laminating films, barrier films, industrial packaging, shrink-wrap films, etc. Each application requires different film properties. The film properties depend on, among other things, the polyethylene composition and the extrusion conditions. The combination of compositions and conditions are significant. To determine the right compositions and conditions for the desired film properties, manufacturers rely on their experience and expertise to guide them through trial and error experimentation. This process to achieve the desired film properties is time consuming (e.g., the experience could take months and the expertise is developed over decades of film conversion) and is costly. More effective techniques are needed to at least narrow the combinations of compositions and conditions to be tested to produce useful and marketable films.

SUMMARY OF THE INVENTION

In a class of embodiments, the invention provides for method for forming a film, the method comprising: generating (1) one or more estimated physical properties of a Polymer A and (2) one or more estimated blown film extrusion conditions using a model comprising a multivariate adaptive regression splines (MARS)-derived algorithm with an input of a desired machine direction tear for a polymer film comprising the Polymer A, wherein Polymer A is a metallocene polyethylene (mPE) synthesized using a hafnium transition metal metallocene-type catalyst system; heating Polymer A to produce a molten Polymer A; and extruding the molten Polymer A using the one or more blown film extrusion conditions to produce the film.

In another class of embodiments, the invention provides for method for forming a film, the method comprising: generating an estimated $Tear_{MD}$ for a polymer film comprising Polymer A using a model comprising a multivariate adaptive regression splines (MARS)-derived algorithm with inputs of one or more physical properties of the Polymer A and one or more blown film extrusion conditions, wherein Polymer A is a metallocene polyethylene (mPE) synthesized using a hafnium transition metal metallocene-type catalyst system; heating Polymer A to produce a molten Polymer A; and extruding the molten Polymer A using the one or more blown film extrusion conditions to produce the film.

In yet another class of embodiments, the invention provides for a computing device that may comprise: a processor; a memory coupled to the processor; and instructions provided to the memory, wherein the instructions are executable by the processor to perform the methods described above.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE INVENTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

The present disclosure relates a model that estimates (A) the machine direction tear of a polymer film based on the physical properties of the polymer and the blown film extrusion conditions or (B) the necessary physical properties of the polymer and the necessary blown film extrusion conditions to achieve a polymer film with a desired machine direction tear. More specifically, the model comprises a multivariate adaptive regression splines-derived algorithm and is specific to polymer films that comprise a hafnium (Hf) metallocene polyethylene referred to herein as Polymer A.

Definitions

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium.

As used herein, the term "metallocene polyethylenes" (mPEs) encompasses polyethylene homopolymers and copolymers of greater than or equal to 50 mol % polyethylene and less than or equal to $C_3$-$C_{20}$ alpha-olefin, wherein the polymers are synthesized using a catalyst system comprising a metallocene catalyst.

As used herein, the term "Polymer A" refers to mPEs synthesized using a hafnium transition metal metallocene-type catalyst system. The properties of Polymer A are provided further herein.

As used herein, the term "Polymer B" refers to mPEs synthesized using a supported catalyst with a bridged bis (alkyl-substituted dicyclopentadienyl) zirconium dichloride transition metal component and methyl alumoxane cocatalyst. The properties of Polymer B are provided further herein.

As used herein, the term "Polymer C" refers to mPEs synthesized using a supported catalyst with a bridged bis-indenyl zirconocene transition metal component and methyl alumoxane cocatalyst. The properties of Polymer C are provided further herein.

As used herein, unless otherwise specified, melt flow rate (MFR) is measured at 190° C. and 2.16 kg per ASTM D1238-13.

As used herein, unless otherwise specified, heavy load melt flow rate (HLMFR) is measured at 190° C. and 21.6 kg per ASTM D1238-13.

As used herein, unless otherwise specified, flow rate ratio (FRR) is the HLMFR divided by the MFR.

As used herein, unless otherwise specified, a bulk density ($\rho$) is measured per ASTM D1505-10.

As used herein, a molecular weight can be reported as number average ($M_n$), weight average ($M_w$) and z-average ($M_z$) as determined by gel permeation chromatography (GPC) as described in "Modern Size-Exclusion Liquid Chromatography, Practice of Gel Permeation and Gel Filtration Chromatography" by W. W. Yau, J. J. Kirkland and D. D. Bly (John Wiley & Sons, 1979); further reference to this text will indicate the chapter and page of "GPC-Yau."

As used herein, a polydispersity index refers to $M_w/M_n$.

As used herein, the term "blown film extrusion" refers to a process where a polymer melt is extruded through a circular die followed by bubble-like expansion.

As used herein, the term "melt temperature" (MT) refers to the polymer melt temperature at the extruder die, which has units of ° F. unless otherwise specified.

As used herein, the term "output rate" (OR) is the extruder throughput, which has units of lb/hr unless otherwise specified.

As used herein, the term "process time" is the calculated time for the polymer melt to travel from the die exit to the frost line height (FLH), which has units of mm unless otherwise specified.

As used herein, the term "strain rate" (STR) is calculated according to EQ. 1, which has units of 1/s unless otherwise specified.

$$STR=(V_{film}-V_{die})/FLH \qquad \text{EQ. 1}$$

where $V_{film}$ is the polymer film travel velocity above the frost line, and $V_{die}$ is the polymer travel velocity at the extruder.

As used herein, the term "draw down ratio" (DDR) is calculated according to EQ. 2, which is unitless.

$$DDR=V_{film}/V_{die} \qquad \text{EQ. 2}$$

As used herein, the term "process time" (PT) is calculated according to EQ. 3, which is seconds (s) unless otherwise specified.

$$PT=FLH/[(V_{film}-V_{die})/\log(V_{film}/V_{die})] \qquad \text{EQ. 3}$$

As used herein, the term "machine direction tear" ($Tear_{MD}$) refers to Elmendorf Tear, which is measured per ASTM D1922-15 but is reported as a normalized value relative to the film thickness with the units of grams per mil (g/mil), unless otherwise specified.

As used herein, the term "model" refers to a system of one or more algorithms.

As used herein, the term "algorithm" carries its normal meaning and refers without limitation to any series of repeatable steps that result in a discrete value or values. For example, an algorithm may include any mathematical, statistical, positional, or relational calculation between any numbers of user-specified, preset, automatically-determined, or industry- or system-acceptable data elements. In several embodiments, various algorithms may be performed on subject data elements in relation to a previously defined data evaluation sample in order to produce a single, meaningful data value.

As used herein, the term "multivariate adaptive regression splines" (MARS) introduced by Jerome H. Friedman (Friedman, J. H. (1991). "*Multivariate Adaptive Regression Splines*". *The Annals of Statistics*, 1991, Vol. 19, No. 1, p 1-141) refers a nonparametric regression procedure that makes no assumption about the underlying functional relationship between the dependent and independent variables. Instead, MARS constructs this relation from a set of coefficients and basic functions, specifically, hinge functions taking the form of max(0, x-constant) or max(0, constant-x) that are entirely driven from the regression data.

The terms "non-transitory, computer-readable medium," "tangible machine-readable medium," or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

Models Using a Multivariate Adaptive Regression Splines-Derived Algorithm

Polymer A includes mPEs with unique properties as compared to other mPEs. For example, the $Tear_{MD}$ as a function of strain rate of Polymer A has a very different trend than other mPEs.

Figure 1:
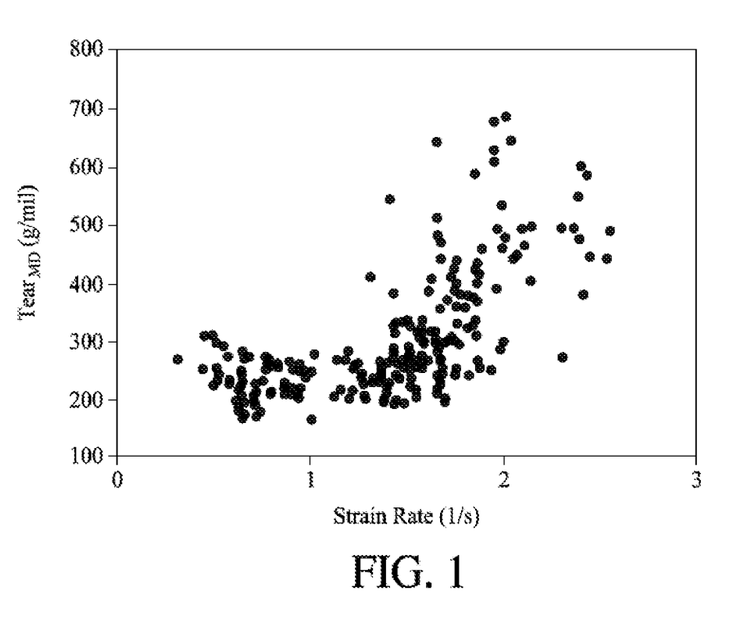
FIG. 1 is a plot of the $Tear_{MD}$ as a function of strain rate for Polymer A.
Figure 2A:
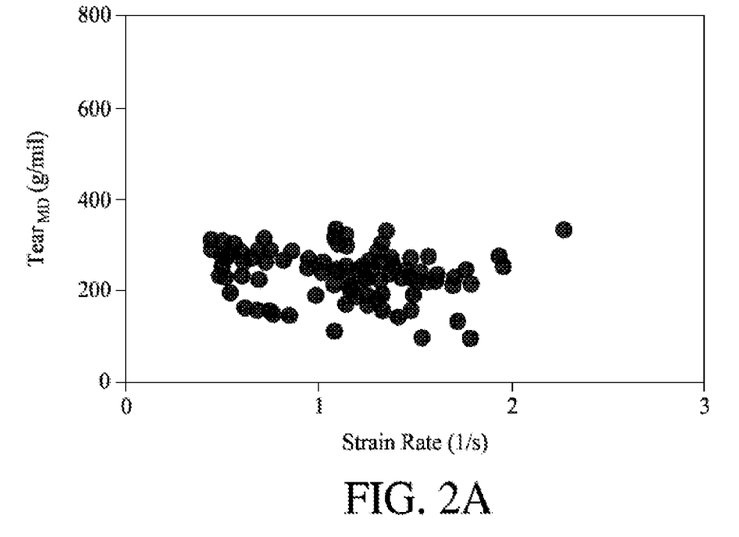
FIGS. 2A and 2B are plots of the $Tear_{MD}$ as a function of strain rate for Polymer B.
Figure 2B:
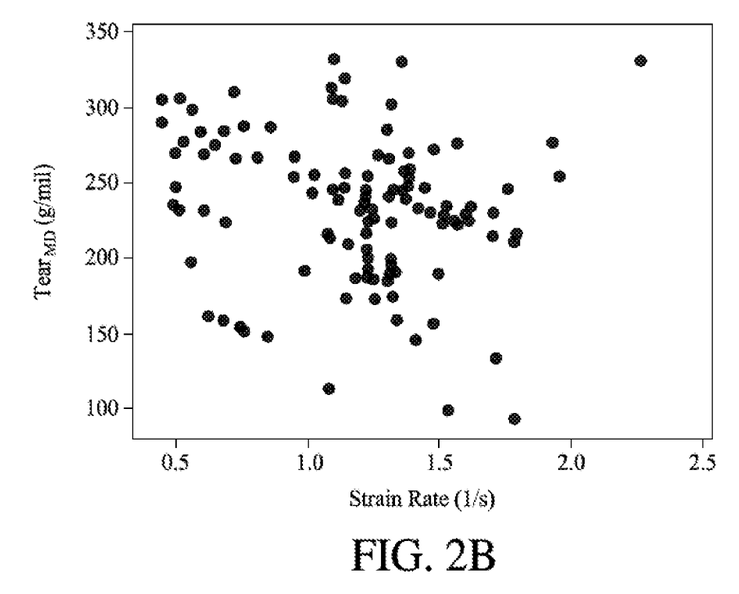
Figure 3A:
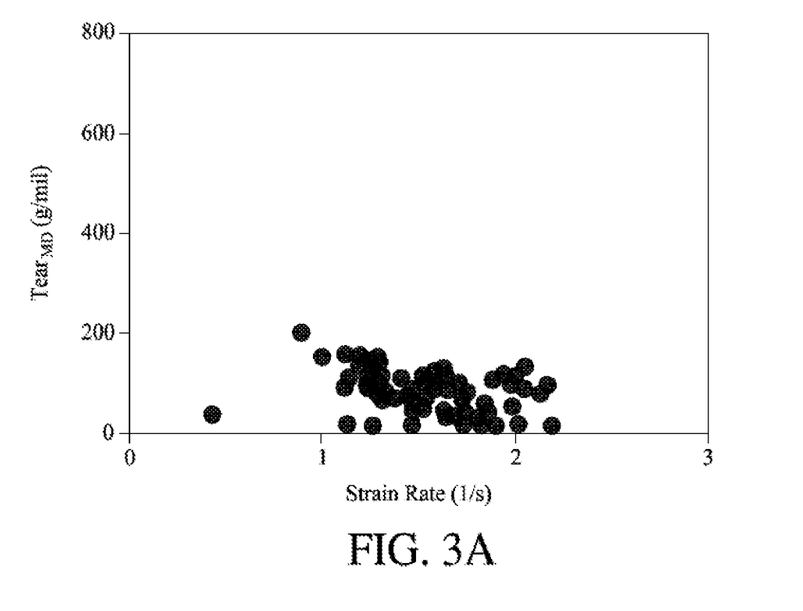
FIGS. 3A and 3B are plots of the $Tear_{MD}$ as a function of strain rate for Polymer C.
Figure 3B:
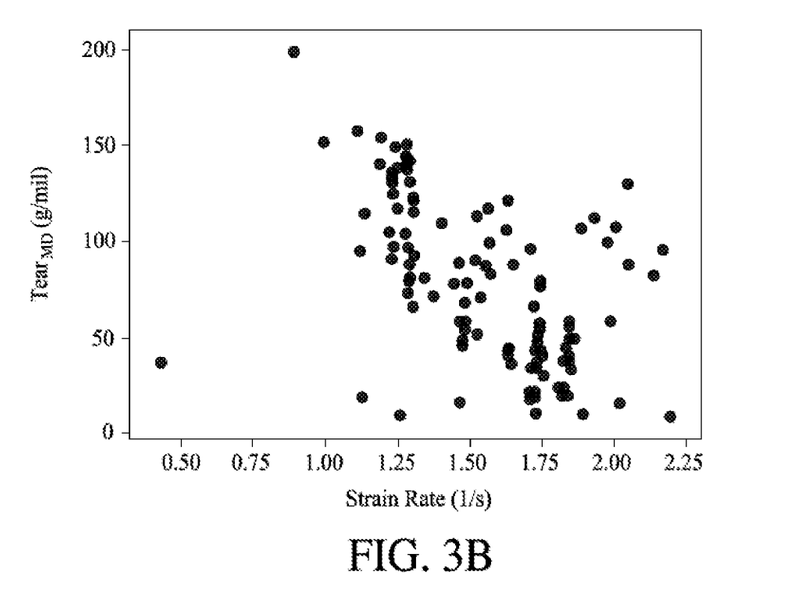

FIG. 1 is a plot of the $Tear_{MD}$ as a function of strain rate during blown film extrusion process for a plurality of films composed of Polymer A. FIGS. 2A and 2B are plots of the $Tear_{MD}$ as a function of strain rate during blown film extrusion process for a plurality of films composed of Polymer B. FIGS. 3A and 3B are plots of the $Tear_{MD}$ as a function of strain rate during blown film extrusion process for a plurality of films composed of Polymer C. FIGS. 1, 2A, and 3A have the same axis sizes for comparison, and FIGS. 2B and 3B are zoomed in version of FIGS. 2A and 3A, respectively.

A comparison of FIGS. 1, 2A, and 3A illustrates that Polymer A has different properties than $Tear_{MD}$ properties than other mPEs. Therefore, general trends or knowledge gleaned from working with other mPEs relative to $Tear_{MD}$ are not applicable to Polymer A. Accordingly, to produce polymer films of Polymer A with a desired $Tear_{MD}$, a producer will have to use a trial and error approach, which can be time consuming and costly.

The present disclosure provides a model that includes a correlation between $Tear_{MD}$ and a combination of Polymer A physical properties and blown film extrusion conditions. The correlation is derived using multivariate adaptive regression splines (MARS). The model may be used either to estimate $Tear_{MD}$ of a polymer film based on the physical properties of Polymer A and the blown film extrusion conditions intended to use or to estimate which physical properties of Polymer A and blown film extrusion conditions are needed to produce a polymer film with a desired $Tear_{MD}$.

The physical properties of Polymer A that can be used in the correlation include, but are not limited to, a bulk density, a melt flow rate, a high load melt flow rate, a flow rate ratio, molecular weight (Mw, Mn, and/or Mz), polydispersity index, and any combination thereof.

The blown film extrusion conditions that can be used in the correlation include, but are not limited to, an output rate, a frost line height, a blow up ratio, a draw down ratio, a die size, a die gap, a melt temperature, a process time, a strain rate, a final film thickness, extruder screw speed, and any combination thereof.

Deriving the algorithm can involve performing a MARS analysis on data that includes $Tear_{MD}$ values and the corresponding Polymer A properties and the corresponding blown film extrusion conditions. The MARS analysis produces an algorithm that can be used in the models described herein.

EQ. 4 is example MARS-derived algorithm that correlates physical properties of Polymer A (specifically, bulk density, melt flow rate, and flow rate ratio) and blown film extrusion conditions (specifically, melt temperature, strain rate, and process time) with $Tear_{MD}$.

$$Ln(Tear_{MD}) = a_1 + a_2 * \max(0, a_3 - MT) - a_4 * \max(0, MT - a_3) + a_5 * \max(0, STR - a_6) + a_7 * \rho * \max(0, MT - a_3) + a_8 * OR * \max(0, STR - a_9) - a_{10} * MFR * \max(0, a_{11} - PT) + a_{12} * MFR * \max(0, a_{13} - STR) + a_{19} * FRR * \max(0, STR - a_{13}) - a_{18} * \max(0, MT - a_{14}) * \max(0, STR - a_{13}) - a_{15} * \max(0, a_{16} - PT) * \max(0, STR - a_{17}),$$ EQ. 4 where $a_1$-$a_{19}$ are coefficients derived from experimental data, max(0, x-constant) and max(0, constant-x) result in unitless values, $a_1$ is unitless, $a_2$ is unitless, $a_3$ has units ° F., $a_4$ is unitless, $a_5$ is unitless, $a_6$ has units 1/s, $a_7$ has units cm³/g, $a_8$ has units hr/lb, $a_9$ has units 1/s, $a_{10}$ has units 10 min/g, $a_{11}$ has units s, $a_{12}$ has units 10 min/g, $a_{13}$ has units 1/s, $a_{14}$ has units ° F., $a_{15}$ is unitless, $a_{16}$ has units s, $a_{17}$ has units 1/s, $a_{18}$ is unitless, $a_{19}$ is unitless, and $Tear_{MD}$ has units g/mil.

Other MARS-derived algorithms can be calculated from experimental data (combinations of Polymer A physical properties, extrusion conditions, and resultant $Tear_{MD}$). Such models can include any number of Polymer A physical properties and extrusion conditions to correlate with $Tear_{MD}$.

For example, an alternative MARS-derived algorithm can correlate physical properties of Polymer A (specifically, bulk density, melt flow rate, and flow rate ratio) and blown film extrusion conditions (specifically, melt temperature, strain rate, process time, and final film thickness) with $Tear_{MD}$.

Additionally, the MARS-derived algorithm can be updated by adding more data points from which the algorithm is derived. For example, a method can include updating (re-deriving) an existing MARS-derived algorithm based on $Tear_{MD}$ data for one or more produced polymer films comprising the Polymer A and corresponding data for the one or more physical properties of the Polymer A and the one or more blown film extrusion conditions.

Updates can include updating the MARS-derived algorithm using the same combination of Polymer A properties and extrusion conditions. Updates can include updating MARS-derived algorithm using additional or fewer Polymer A properties and/or additional or fewer extrusion conditions. For example, the MARS-derived algorithm of EQ. 4 can be updated with the same combination of Polymer A properties and extrusion conditions, which would update the coefficient values. Alternatively, the MARS-derived algorithm of EQ. 4 can be updated to further include final film thickness as an extrusion condition, which would result in more terms in the algorithm.

Methods of Applying the Models Described Herein

The models described herein include a MARS-derived algorithm that correlates the physical properties of Polymer A and the blown film extrusion conditions with the $Tear_{MD}$ of the final blown film. The models can be applied in either direction of the correlation. That is, the models can be applied to generate (A) the $Tear_{MD}$ of a polymer film based on the physical properties of the polymer and the blown film extrusion conditions or (B) the necessary physical properties of the polymer and the necessary blown film extrusion conditions to achieve a polymer film with a desired $Tear_{MD}$.

For example, a method of the present disclosure can include generating an estimated $Tear_{MD}$ for a polymer film comprising Polymer A using a model comprising a MARS-derived algorithm (e.g., EQ. 4 or a variation thereof) with inputs of one or more desired physical properties of the Polymer A and one or more desired blown film extrusion conditions. This method can be performed iteratively to generate a $Tear_{MD}$ for more than one combination of Polymer A physical properties and extrusion conditions. The iterative method may be useful, for example, when several Polymer A compositions are available. Additionally, iterative method may be useful, for example, when more than one blown film extrusion line is available. For a manufacturer, this may be useful in determining the capabilities of the existing equipment and in evaluating upgrades and new equipment.

The foregoing methods of the present disclosure can optionally further include producing a polymer film with the Polymer A composition physical properties and extrusion conditions. The combination of Polymer A physical properties ±5% and extrusion conditions ±5% used to produce the polymer film can be those initially used in the model or those from an iterative analysis. The slight variation (±5%) in the Polymer A physical properties and/or the extrusion conditions allows for using the model and then using slightly different compositions/conditions due to the compositions of Polymer A available and the blown film extrusion equipment capabilities.

Another method of the present disclosure can include generating one or more estimated physical properties of a Polymer A and one or more estimated blown film extrusion conditions using a model comprising a MARS-derived algorithm (e.g., EQ. 4 or a variation thereof) with an input of a desired Tear$_{MD}$ for a polymer film comprising the Polymer A. In this method, the output can be one or more sets of physical properties and extrusion conditions. That is, more than one combination of Polymer A physical properties and extrusion conditions can produce a Tear$_{MD}$. A choice between which combination to use may be determined by the compositions of Polymer A available, the blown film extrusion equipment capabilities, and other polymer film properties associated with the combination. For example, a first combination of Polymer A physical properties and extrusion conditions may produce a polymer film with a first haze, and a second combination of Polymer A physical properties and extrusion conditions may produce a polymer film with a second haze. The desired haze value may be considered when determining which Polymer A physical properties and extrusion conditions to use in producing polymer films. The other polymer film properties considered may be evaluated by other models and/or may be determined experimentally. If determined experimentally, the number of experiments and associated time and cost are greatly reduced because the model of the present disclosure greatly reduces the number of combinations of Polymer A physical properties and extrusion conditions to be tested.

Once a combination of Polymer A physical properties and extrusion conditions has been selected, the blown film extrusion conditions and physical properties may be slightly varied to account for the compositions of Polymer A available and the blown film extrusion equipment capabilities. For example, the method can further include forming the polymer film using the one or more estimated blown film extrusion conditions ±5% with the Polymer A having the one or more estimated physical properties ±5%. For example, if the one or more estimated blown film extrusion conditions includes a melt temperature of about 100° C., then the polymer film may be produced with a melt temperature of about 95° C. to about 105° C. In another example, if the one or more estimated physical properties includes a MFR of about 0.53 g/10 min, then the polymer film may be produced with a Polymer A composition having a MFR of about 0.50 g/10 min to 0.56 about g/10 min.

Additional methods include updating the MARS-based algorithm based on the polymer films produced in the foregoing methods. For example, the polymer films produced using the Polymer A properties/extrusion conditions determined based on the model with a desired Tear$_{MD}$ input can be tested where the measured Tear$_{MD}$, the properties of the Polymer A used, and the extrusion conditions used are input as data points for updating (re-deriving) the MARS-based algorithm. Alternatively or additionally, polymer films can be produced using Polymer A and the Tear$_{MD}$ measured. The corresponding data can be used as data points for updating the MARS-based algorithm.

Computing Devices

The methods described herein can be performed on computing devices (or processor-based devices) that include a processor; a memory coupled to the processor; and instructions provided to the memory, wherein the instructions are executable by the processor to perform the methods described herein. The instructions can be a portion of code on a non-transitory computer readable medium. Any suitable processor-based device may be utilized for implementing all or a portion of embodiments of the present techniques, including without limitation personal computers, networks personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

Polymer A

Polymer A comprises from 70.0 mole % to or 100.0 mole % of units derived from ethylene. The lower limit on the range of ethylene content may be from 70.0 mole %, 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, or 99.0 mole % based on the mole % of polymer units derived from ethylene. The Polymer A may have an upper ethylene limit of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. For Polymer A, the polyethylene polymer may have less than 50.0 mole % of polymer units derived from a $C_3$-$C_{20}$ olefin, preferably, an alpha-olefin, e.g., hexene or octene. The lower limit on the range of $C_3$-$C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, or 0.5 mole %, based on polymer units derived from the $C_3$-$C_{20}$ olefin. The upper limit on the range of $C_3$-$C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, or 1.0 mole %, based on polymer units derived from the $C_3$ to $C_{20}$ olefin. Any of the lower limits may be combined with any of the upper limits to form a range. Comonomer content is based on the total content of all monomers in the polymer.

Polymer A may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis}$≥0.980, 0.985, ≥0.99, ≥0.995, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

Polymer A may have a bulk density of from about 0.910 to about 0.925 g/cm³, from about 0.910 to about 0.923 g/cm³, from about 0.910 to about 0.920 g/cm³, from about 0.915 to about 0.921 g/cm³, from about 0.910 to about 0.918 g/cm³, from about 0.912 to about 0.918 g/cm³, or from about 0.912 to 0.917 g/cm³.

The $M_w$ of Polymer A may be from about 15,000 to about 500,000 g/mol, from about 20,000 to about 250,000 g/mol, from about 25,000 to about 150,000 g/mol, from about 150,000 to about 400,000 g/mol, from about 200,000 to about 400,000 g/mol, or from about 250,000 to about 350,000 g/mol.

Polymer A may have a polydispersity index of from about 1.5 to about 5.0, from about 2.0 to about 4.0, from about 3.0 to about 4.0, or from about 2.5 to about 4.0.

Polymer A may have $M_z$ to $M_w$ ratio greater than about 1.5, or greater than about 1.7, or greater than about 2.0. In some embodiments, this ratio is from about 1.7 to about 3.5, from about 2.0 to about 3.0, or from about 2.2 to about 3.0.

Polymer A may have a MFR (190° C./2.16 kg) of about 0.1 to about 300 g/10 min, about 0.1 to about 100 g/10 min, about 0.1 to about 50 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, about 0.5 g/10 min to about 1.0 g/10 min, about 0.6 g/10 min to about 1.0 g/10 min, about 0.7 g/10 min to about 1.0 g/10 min, or about 0.75 g/10 min to about 0.95 g/10 min.

Polymer A may have a FFR of from about 10.0 to about 50.0, from about 15.0 to about 45.0, from about 20.0 to about 40.0, from about 20.0 to about 35.0, from about 22 to about 38, from about 20 to about 32, from about 25 to about 31, or from about 28 to about 30.

Polymer A may contain less than 5.0 ppm hafnium, less than 2.0 ppm hafnium, less than 1.5 ppm hafnium, or less than 1.0 ppm hafnium. For example, Polymer A may contain from about 0.01 ppm to about 2 ppm hafnium, from about 0.01 ppm to about 1.5 ppm hafnium, or from about 0.01 ppm to about 1.0 ppm hafnium.

Typically, the amount of hafnium is greater than the amount of zirconium in Polymer A. In a particular class of embodiments, the ratio of hafnium to zirconium (ppm/ppm) is at least about 2.0, at least about 10.0, at least about 15, at least about 17.0, at least about 20.0, at least about 25.0, at least about 50.0, at least about 100.0, at least about 200.0, or at least about 500.0 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in Polymer A. Thus, the upper limit on the ratio of hafnium to zirconium in Polymer A may be quite large.

Polymer A may have at least a first peak and a second peak in a comonomer distribution analysis, wherein the first peak has a maximum at a $\log(M_w)$ value of 4.0 to 5.4, 4.3 to 5.0, or 4.5 to 4.7; and a temperature rising elution fraction (TREF) elution temperature of 70.0° C. to 100.0° C., 80.0° C. to 95.0° C., or 85.0° C. to 90.0° C. The second peak in the comonomer distribution analysis has a maximum at a $\log(M_w)$ value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C. TREF is described in Wild, et al., J. Poly. Sci., Poly. Phys. Ed., Vol. 20, p. 441 (1982) and U.S. Pat. No. 5,008,204, which are fully incorporated herein by reference.

Polymer A may have one or more of the following properties: a MFR (190° C./2.16 kg) of from about 0.1 g/10 min to about 5.0 g/10 min; a FRR of from about 15 to about 30; a $M_w$ of from about 20,000 to about 200,000 g/mol; a $M_w/M_n$ of from about 2.0 to about 4.5; and a density of from about 0.910 to about 0.925 g/cm³. Additionally, the amount of hafnium is greater than the amount of zirconium and a ratio of hafnium to zirconium (ppm/ppm) may be at least about 2.0, at least about 10.0, at least about 15.0, at least about 17.0, at least about 20.0, or at least about 25.0.

Polymer A may have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In some embodiments, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

Additionally, the melt strength of Polymer A at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The melt strength of Polymer A may be in the range from about 1 to about 100 cN, about 1 to about 50 cN, about 1 to about 25 cN, about 3 to about 15 cN, about 4 to about 12 cN, or about 5 to about 10 cN.

Materials and processes for making the Polymer A have been described in, for example, U.S. Pat. No. 6,956,088, particularly Example 1; U.S. Publication No. 2009/0297810, particularly Example 1; U.S. Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

Polymer B

Polymer B includes ethylene-based polymers comprising ≥50.0 wt % of polymer units derived from ethylene and ≤50.0 wt % preferably 1.0 wt % to 35.0 wt %, even more preferably 1 to 6 wt % of polymer units derived from a $C_3$ to $C_{20}$ alpha-olefin comonomer (for example, hexene or octene).

Polymer B may have a bulk density of ≥about 0.910 g/cm³, ≥about 0.915 g/cm³, ≥about 0.920 g/cm³, ≥about 0.925 g/cm³, ≥about 0.930 g/cm³, or ≥about 0.940 g/cm³. Alternatively, Polymer B may have a bulk density of ≤about 0.950 g/cm³, e.g., ≤about 0.940 g/cm³, ≤about 0.930 g/cm³, ≤about 0.925 g/cm³, ≤about 0.920 g/cm³, or ≤about 0.915 g/cm³. Ranges expressly disclosed include ranges formed by combinations of any of the above-enumerated values (e.g., 0.910 to 0.950 g/cm³, 0.910 to 0.930 g/cm³, 0.910 to 0.925 g/cm³, etc.).

Polymer B may have a MFR (190° C./2.16 kg) of ≥about 0.5 g/10 min, e.g., ≥about 0.5 g/10 min, ≥about 0.7 g/10 min, ≥about 0.9 g/10 min, ≥about 1.1 g/10 min, ≥about 1.3 g/10 min, ≥about 1.5 g/10 min, or ≥about 1.8 g/10 min. Alternatively, the MFR may be ≤about 8.0 g/10 min, ≤about 7.5 g/10 min, ≤about 5.0 g/10 min, ≤about 4.5 g/10 min, ≤about 3.5 g/10 min, ≤about 3.0 g/10 min, ≤about 2.0 g/10 min, e.g., ≤about 1.8 g/10 min, ≤about 1.5 g/10 min, ≤about 1.3 g/10 min, ≤about 1.1 g/10 min, ≤about 0.9 g/10 min, or ≤about 0.7 g/10 min, 0.5 to 2.0 g/10 min, particularly 0.75 to 1.5 g/10 min Ranges expressly disclosed include ranges formed by combinations of any of the above-enumerated values (e.g., about 0.5 to about 8.0 g/10 min, about 0.7 to about 1.8 g/10 min, about 0.9 to about 1.5 g/10 min, about 0.9 to 1.3, about 0.9 to 1.1 g/10 min, about 1.0 g/10 min, etc.).

Polymer B may have a density of 0.910 to 0.920 g/cm$^3$, a MFR of 0.5 to 8.0 g/10 min, and a composition distribution index (CDBI) of 60.0% to 80.0% (preferably between 65% and 80%). The FRR for Polymer B is typically from about 15 to about 20. The term "Composition distribution breadth index" (CDBI) is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is TREF.

Polymer C

Polymer C includes ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

Polymer C comprises from about 8 wt % to about 15 wt %, of $C_3$-$C_{10}$ α-olefin derived units, and from about 92 wt % to about 85 wt % ethylene derived units, based upon the total weight of the polymer. For example, Polymer C can comprise from about 9 wt % to about 12 wt %, of $C_3$-$C_{10}$ α-olefin derived units, and from about 91 wt % to about 88 wt % ethylene derived units, based upon the total weight of the polymer.

Polymer C may have a MFR (190° C./2.16 kg) of ≥about 0.10 g/10 min, ≥about 0.15 g/10 min, ≥about 0.18 g/10 min, ≥about 0.20 g/10 min, ≥about 0.22 g/10 min, ≥about 0.25 g/10 min, ≥about 0.28, or ≥about 0.30 g/10 min Additionally, Polymer C may have a MFR ≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min Ranges expressly disclosed include, but are not limited to, ranges formed by combinations of any of the above-enumerated values (e.g., from about 0.1 to about 3.0, about 0.2 to about 2.0, about 0.2 to about 0.5 g/10 min, etc.).

Polymer C may have a FRR of the first additional polyethylene polymers may be from 25 to 80, alternatively, from 25 to 60, alternatively, from about 30 to about 55, and alternatively, from about 35 to about 50.

Polymer C may have a density ≥about 0.905 g/cm$^3$, ≥about 0.910 g/cm$^3$, ≥about 0.912 g/cm$^3$, ≥about 0.913 g/cm$^3$, ≥about 0.915 g/cm$^3$, ≥about 0.916 g/cm$^3$, ≥about 0.917 g/cm$^3$, ≥about 0.918 g/cm$^3$. Polymer C may have a density ≤about 0.945 g/cm$^3$, e.g., ≤about 0.940 g/cm$^3$, ≤about 0.937 g/cm$^3$, ≤about 0.935 g/cm$^3$, ≤about 0.930 g/cm$^3$, ≤about 0.925 g/cm$^3$, ≤about 0.920 g/cm$^3$, or ≤about 0.918 g/cm$^3$. Ranges expressly disclosed include, but are not limited to, ranges formed by combinations of any of the above-enumerated values (e.g., from about 0.905 to about 0.945 g/cm$^3$, 0.910 to about 0.935 g/cm$^3$, 0.912 to 0.930 g/cm$^3$, 0.916 to 0.925 g/cm$^3$, 0.918 to 0.920 g/cm$^3$, etc.).

Typically, although not necessarily, Polymer C may have a polydispersity index of about 2.5 to about 5.5, preferably 3.0 to 4.0.

The melt strength may be in the range from about 1 to about 100 cN, about 1 to about 50 cN, about 1 to about 25 cN, about 3 to about 15 cN, about 4 to about 12 cN, or about 5 to about 10 cN.

Polymer C (or sheets made therefrom) may also be characterized by an averaged 1% secant modulus (M) of from 10,000 to 60,000 psi (pounds per square inch), alternatively, from 20,000 to 40,000 psi, alternatively, from 20,000 to 35,000 psi, alternatively, from 25,000 to 35,000 psi, and alternatively, from 28,000 to 33,000 psi, and a relation between M and the dart drop impact strength (DIS) in g/mil complying with EQ. 5.

$$DIS \geq 0.8 * [100 + e^{(11.71 - 0.000268M + 2.183 \times 10^{-9}M^2)}] \quad \text{EQ. 5,}$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$.

Typically, Polymer C has a g'vis of 0.85 to 0.99, particularly, 0.87 to 0.97, 0.89 to 0.97, 0.91 to 0.97, 0.93 to 0.95, or 0.97 to 0.99.

Polymer C may be made by any suitable polymerization method including solution polymerization, slurry polymerization, supercritical, and gas phase polymerization using supported or unsupported catalyst systems, such as a system incorporating a metallocene catalyst.

Metallocene catalysts generally require activation with a suitable co-catalyst, or activator, in order to yield an "active metallocene catalyst" (i.e., an organometallic complex with a vacant coordination site that can coordinate, insert, and polymerize olefins). Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in producing Polymer C include those described in, U.S. Pat. Nos. 5,466,649, 6,476,171, 6,225,426, and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., KAYDO™ or DRAKOL™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399, 4,588,790, 5,028,670, 5,317,036, 5,352,749, 5,405,922, 5,436,304, 5,453,471, 5,462,999, 5,616,661, and 5,668,228.) To obtain the first additional polyethylene polymers, individual flow rates of ethylene, comonomer, and hydrogen should be controlled and adjusted to obtain the desired polymer properties.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

218 polymer films comprising Polymer A compositions were produced. The $Tear_{MD}$ of each was measured. FIG. 1 is the plot of the $Tear_{MD}$ as a function of strain rate for Polymer A.

The data in FIG. 1 and the corresponding physical properties of Polymer A (specifically, bulk density, melt flow rate, and flow rate ratio) and blown film extrusion conditions (specifically, melt temperature, strain rate, and process time) were analyzed with MARS to derive a MARS-based algorithm that correlates the $Tear_{MD}$ to the Polymer A properties and the blown film extrusion conditions. The resultant MARS-based algorithm is EQ. 4.

Figure 4A:
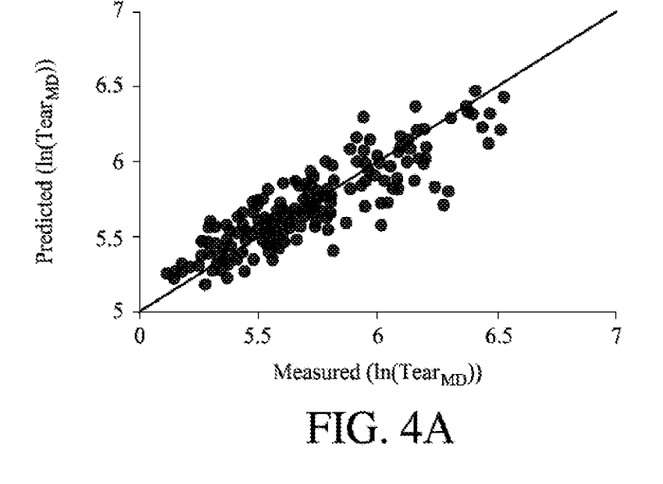
FIG. 4A is a plot of the measured $Tear_{MD}$ versus the estimated $Tear_{MD}$, each represented as $\ln(Tear_{MD})$ in the plot with a 1:1 line inserted for reference.

Then, the Polymer A physical properties and extrusion conditions on which the analysis was based were run through MARS-based algorithm to get an estimated $Tear_{MD}$. FIG. 4A is a plot of the measured $Tear_{MD}$ versus the estimated $Tear_{MD}$, each represented as $\ln(Tear_{MD})$ in the plot. A 1:1 line is inserted for reference of accurate correlations. As the plot illustrates, the MARS-based algorithm generates estimated $Tear_{MD}$ values with reasonable accuracy. The standard deviation for FIG. 4A is 53 g/mil.

Figure 4B:
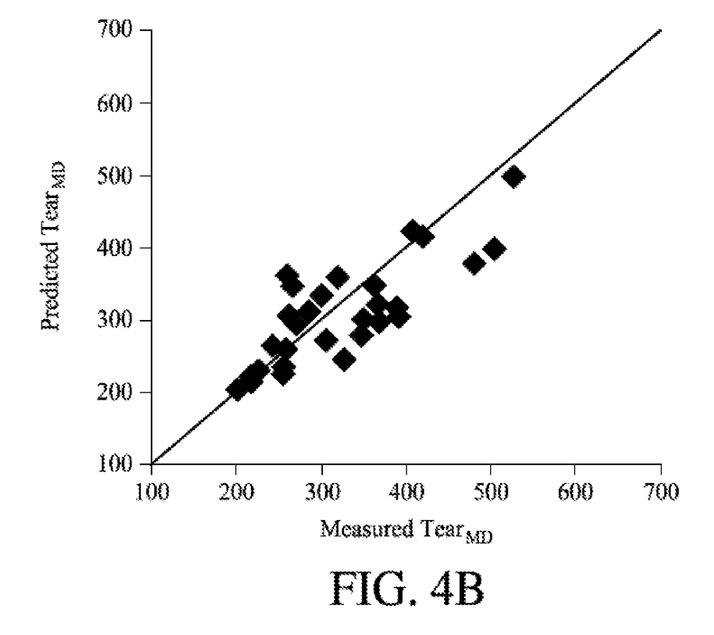
FIG. 4B is a plot of the measured $Tear_{MD}$ versus the estimated $Tear_{MD}$ for the 30 additional polymer films with a 1:1 line inserted for reference.

Then 30 additional polymer films comprising Polymer A were produced and $Tear_{MD}$ measured. The data for the 30 additional polymer films were analyzed with the MARS-based algorithm derived above. FIG. 4B is a plot of the measured $Tear_{MD}$ versus the estimated $Tear_{MD}$ for the 30 additional polymer films again with reasonable agreement between the measured and estimated values. Optionally, the data from the 30 additional polymer films could be used to re-derive the MARS-based algorithm for increased accuracy.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

What is claimed is:

1. A method for forming a polymer film, the method comprising:

generating (1) one or more estimated physical properties of a Polymer A and (2) one or more estimated blown film extrusion conditions using a model comprising a multivariate adaptive regression splines (MARS)-derived algorithm with an input of a desired machine direction tear ($Tear_{MD}$) for a polymer film comprising the Polymer A, wherein Polymer A is a metallocene polyethylene (mPE) synthesized using a hafnium metallocene-type catalyst system;

heating Polymer A to produce a molten Polymer A; and extruding the molten Polymer A using the one or more blown film extrusion conditions to produce the polymer film;

wherein the MARS-derived algorithm is:

$Ln(Tear_{MD}) = a_1 + a_2*\max(0, a_3-MT) - a_4*\max(0, MT-a_3) + a_5*\max(0, STR-a_6) + a_7*\rho*\max(0, MT-a_3) + a_8*OR*\max(0, STR-a_9) - a_{10}*MFR*\max(0, a_{11}-PT) + a_{12}*MFR*\max(0, a_{13}-STR) + a_{19}*FRR*\max(0, STR-a_{13}) - a_{18}*\max(0, MT-a_{14})*\max(0, STR-a_{13}) - a_{15}*\max(0, a_{16}-PT)*\max(0, STR-a_{17})$, where $a_1$-$a_{19}$ are coefficients derived from experimental data, max(0, x-constant) and max(0, constant-x) result in unitless values, $a_1$ is unitless, $a_2$ is unitless, $a_3$ has units ° F., $a_4$ is unitless, $a_5$ is unitless, $a_6$ has units 1/s, $a_7$ has units cm$^3$/g, $a_8$ has units hr/lb, $a_9$ has units 1/s, $a_{10}$ has units 10 min/g, $a_{11}$ has units s, $a_{12}$ has units 10 min/g, $a_{13}$ has units 1/s, $a_{14}$ has units ° F., $a_{15}$ is unitless, $a_{16}$ has units s, $a_{17}$ has units 1/s, $a_{18}$ is unitless, $a_{19}$ is unitless, machine direction tear ($Tear_{MD}$) has units g/mil, melt temperature (MT) has units ° F., strain rate (STR) has units 1/s, bulk density ($\rho$) has units g/cm$^3$, output rate (OR) has units lb/hr, melt flow rate (MFR) has units g/10 min, process time (PT) has units s, flow rate ratio (FRR) is unitless.

2. The method of claim 1, further comprising:

forming the polymer film using the one or more blown film extrusion conditions ±5% with the Polymer A having the one or more estimated physical properties ±5%.

3. The method of claim 1, further comprising updating the MARS-derived algorithm based on machine direction tear data for one or more produced polymer films comprising the Polymer A and corresponding (1) one or more physical properties of the Polymer A and (2) one or more blown film extrusion conditions.

4. A method for forming a polymer film, the method comprising:

generating an estimated $Tear_{MD}$ for a polymer film comprising Polymer A using a model comprising a multivariate adaptive regression splines (MARS)-derived algorithm with inputs of (1) one or more physical properties of the Polymer A and (2) one or more blown film extrusion conditions, wherein Polymer A is a metallocene polyethylene (mPE) synthesized using a hafnium metallocene-type catalyst system;

heating Polymer A to produce a molten Polymer A; and extruding the molten Polymer A using the one or more blown film extrusion conditions to produce the polymer film;

wherein the MARS-derived algorithm is:

$Ln(Tear_{MD}) = a_1 + a_2*\max(0, a_3-MT) - a_4*\max(0, MT-a_3) + a_5*\max(0, STR-a_6) + a_7*\rho*\max(0, MT-a_3) + a_8*OR*\max(0, STR-a_9) - a_{10}*MFR*\max(0, a_{11}-PT) + a_{12}*MFR*\max(0, a_{13}-STR) + a_{19}*FRR*\max(0, STR-a_{13}) - a_{18}*\max(0, MT-a_{14})*\max(0, STR-a_{13}) - a_{15}*\max(0, a_{16}-PT)*\max(0, STR-a_{17})$, where $a_1$-$a_{19}$ are coefficients derived from experimental data, max(0, x-constant) and max(0, constant-x) result in unitless values, $a_1$ is unitless, $a_2$ is unitless, $a_3$ has units ° F., $a_4$ is unitless, $a_5$ is unitless, $a_6$ has units 1/s, $a_7$ has units cm$^3$/g, $a_8$ has units hr/lb, $a_9$ has units 1/s, $a_{10}$ has units 10 min/g, $a_{11}$ has units s, $a_{12}$ has units 10 min/g, $a_{13}$ has units 1/s, $a_{14}$ has units ° F., $a_{15}$ is unitless, $a_{16}$ has units s, $a_{17}$ has units 1/s, $a_{18}$ is unitless, $a_{19}$ is unitless, machine direction tear ($Tear_{MD}$) has units g/mil, melt temperature (MT) has units ° F., strain rate (STR) has units 1/s, bulk density ($\rho$) has units g/cm$^3$, output rate (OR) has units lb/hr, melt flow rate (MFR) has units g/10 min, process time (PT) has units s, flow rate ratio (FRP) is unitless.

5. The method of claim 4, further comprising:

forming the polymer film using the one or more blown film extrusion conditions ±5% with the Polymer A having the one or more physical properties ±5%.

6. The method of claim 4, further comprising updating the MARS-derived algorithm based on machine direction tear data for one or more produced polymer films comprising the Polymer A and corresponding (1) one or more physical properties of the Polymer A and (2) one or more blown film extrusion conditions.

* * * * *